US012604292B2

(12) United States Patent
Wang et al.

(10) Patent No.: US 12,604,292 B2
(45) Date of Patent: Apr. 14, 2026

(54) RELAY COMMUNICATION METHOD AND APPARATUS

(71) Applicant: KONINKLIJKE PHILIPS N.V., Eindhoven (NL)

(72) Inventors: Wen Wang, Chang'an Dongguan (CN); Qian Zheng, Chang'an Dongguan (CN); Zhenhua Xie, Chang'an Dongguan (CN)

(73) Assignee: Koninklijke Philips N.V., Eindhoven (NL)

( * ) Notice: Subject to any disclaimer, the term of this patent is extended or adjusted under 35 U.S.C. 154(b) by 360 days.

(21) Appl. No.: 18/333,311

(22) Filed: Jun. 12, 2023

(65) Prior Publication Data

US 2023/0337169 A1 Oct. 19, 2023

Related U.S. Application Data

(63) Continuation of application No. PCT/CN2021/137776, filed on Dec. 14, 2021.

(30) Foreign Application Priority Data

Dec. 18, 2020 (CN) ........................ 202011507736.X

(51) Int. Cl.
*H04W 60/04* (2009.01)
*H04W 76/20* (2018.01)
*H04W 84/04* (2009.01)

(52) U.S. Cl.
CPC ........... *H04W 60/04* (2013.01); *H04W 76/20* (2018.02); *H04W 84/042* (2013.01)

(58) Field of Classification Search
None
See application file for complete search history.

(56) References Cited

U.S. PATENT DOCUMENTS

| | | | |
|---|---|---|---|
| 2014/0206352 A1 | 7/2014 | Mochizuki et al. | |
| 2018/0295497 A1 | 10/2018 | Kim et al. | |
| 2019/0110238 A1 | 4/2019 | Buckley | |
| 2019/0182789 A1* | 6/2019 | Kim ................... | H04W 36/125 |
| 2019/0223239 A1 | 7/2019 | Adachi et al. | |

(Continued)

FOREIGN PATENT DOCUMENTS

| | | |
|---|---|---|
| CN | 109788507 A | 5/2019 |
| CN | 111183662 A | 5/2020 |

(Continued)

OTHER PUBLICATIONS

LG, "Report of Email Discussion [97bis#18][LTE/FeD2D]—System Information," 3GPP TSG RAN WG2#98, R2-1705767, Hangzhou, China, May 15-19, 2017.

(Continued)

*Primary Examiner* — Anh Vu H Ly

(57) ABSTRACT

This application discloses a relay communication method and apparatus, and pertains to the field of wireless communication technologies. The relay communication method performed by a first terminal includes: sending first information to a second terminal. The first information is used to indicate information related to a serving cell for the first terminal or used to indicate that mobility registration updating or radio access network-based notification area updating is performed by the second terminal.

9 Claims, 8 Drawing Sheets

Receive first information sent by a first terminal, the first information being used to indicate information related to a serving cell for the first terminal or used to indicate that mobility registration updating or radio access network-based notification area updating is performed by a second terminal — 61

Determine, based on the first information, whether to perform mobility registration updating or radio access network-based notification area updating — 62

(56) References Cited

U.S. PATENT DOCUMENTS

| | | | | |
|---|---|---|---|---|
| 2020/0275258 A1 | 8/2020 | Huang | | |
| 2022/0141756 A1* | 5/2022 | Pan | H04W 48/12 | 370/328 |
| 2022/0312376 A1* | 9/2022 | Wu | H04W 68/04 | |
| 2023/0014030 A1 | 1/2023 | Li et al. | | |
| 2023/0269573 A1* | 8/2023 | Orsino | H04W 8/02 | 455/11.1 |
| 2023/0292391 A1* | 9/2023 | Mochizuki | H04W 76/27 | |

FOREIGN PATENT DOCUMENTS

| | | | |
|---|---|---|---|
| CN | 111432469 A | 7/2020 |
| EP | 4255025 A1 | 10/2023 |
| WO | 2013022067 A1 | 2/2013 |
| WO | 2018061760 A1 | 4/2018 |
| WO | 2018194390 A1 | 10/2018 |

OTHER PUBLICATIONS

Interdigital Inc., "Control Plane Aspects for UE to NW Relays," EGPP RAN WG2 Meeting #112, Electronic, R2-2009202, Electronic meeting, Nov. 2020.

Ericsson, "RAN2 Impacts Introduced by Layer 2 SL Relay," 3GPP TSG-RAN WG2 #112e, R2-2009230, Electronic meeting, Nov. 2-13, 2020.

Sony, "L2 Relay Control Plane Procedures," 3GPP TSG-RAN WG2 Meeting #115, R2-2108060 Electronic meeting, Aug. 9-27, 2021.

Vivo, "Discussion on Relay TAI in the Discovery Additional Message," 3GPP TSG-SA WG2 Meeting #147 e-meeting, S2-2107458, Elbonia, Oct. 18-22, 2021.

International Search Report and Written Opinion of the International Searching Authority dated Mar. 1, 2022 as received in Application No. PCT/CN2021/137776.

* cited by examiner

Figures 5, 6:
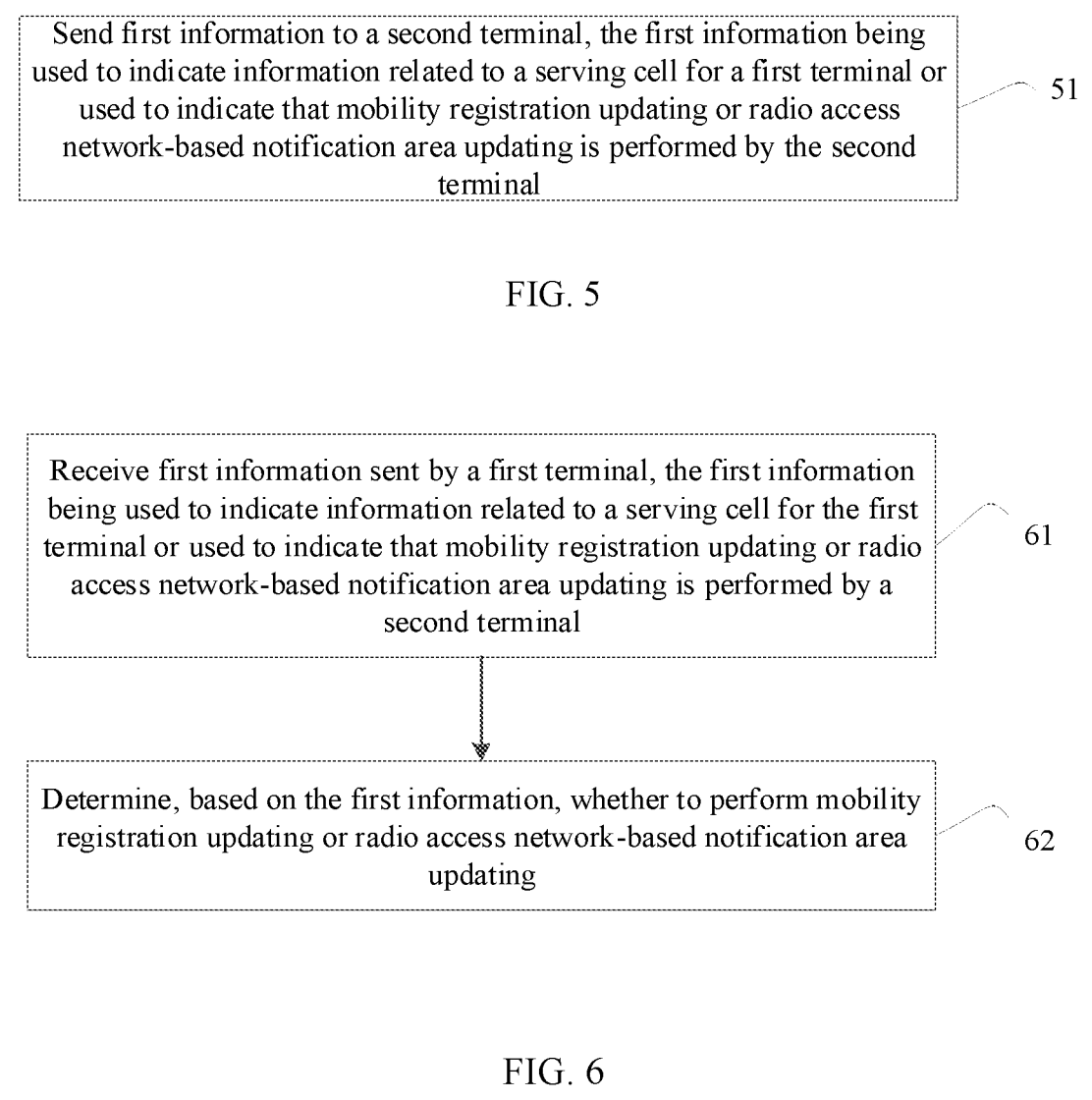

Send first information to a second terminal, the first information being used to indicate information related to a serving cell for a first terminal or used to indicate that mobility registration updating or radio access network-based notification area updating is performed by the second terminal

Receive first information sent by a first terminal, the first information being used to indicate information related to a serving cell for the first terminal or used to indicate that mobility registration updating or radio access network-based notification area updating is performed by a second terminal

61

Determine, based on the first information, whether to perform mobility registration updating or radio access network-based notification area updating

RELAY COMMUNICATION METHOD AND APPARATUS

CROSS-REFERENCE TO RELATED APPLICATIONS

This application is continuation application of PCT International Application No. PCT/CN2021/137776 filed on Dec. 14, 2021, which claims priority to Chinese Patent Application No. 202011507736.X filed in China on Dec. 18, 2020, which is incorporated herein by reference in its entirety.

TECHNICAL FIELD

This application pertains to the field of wireless communication technologies, and specifically, to a relay communication method and apparatus.

BACKGROUND

After a remote terminal (remote User Equipment, remote UE) establishes a relay link through a relay terminal (relay User Equipment, relay UE), due to mobility (although a relay connection link is still maintained between the relay UE and the remote UE), the remote UE may move out of a configured registration area or radio access network-based notification area. However, the remote UE may be out of coverage of a serving cell, and therefore cannot sense (or acquire) information of the current serving cell, thus failing to determine whether it has moved out of the configured registration area or radio access network-based notification area. As a result, the remote UE cannot initiate a mobility registration update or radio access network-based notification area (RAN-based Notification Area, RNA) update procedure in time to acquire the latest registration area or RNA.

SUMMARY

According to a first aspect, a relay communication method is provided and performed by a first terminal. The method includes:

sending first information to a second terminal, the first information being used to indicate information related to a serving cell for the first terminal or used to indicate that mobility registration updating or radio access network-based notification area updating is performed by the second terminal.

According to a second aspect, a relay communication method is provided and performed by a second terminal. The method includes:

receiving first information sent by a first terminal, the first information being used to indicate information related to a serving cell for the first terminal or used to indicate that mobility registration updating or radio access network-based notification area updating is performed by the second terminal; and determining, based on the first information, whether to perform mobility registration updating or radio access network-based notification area updating.

According to a third aspect, a relay communication apparatus is provided and includes:

a sending module configured to send first information to a second terminal, the first information being used to indicate information related to a serving cell for a first terminal or used to indicate that mobility registration updating or radio access network-based notification area updating is performed by the second terminal.

According to a fourth aspect, a relay communication apparatus is provided and includes:

a receiving module configured to receive first information sent by a first terminal, the first information being used to indicate information related to a serving cell for the first terminal or used to indicate that mobility registration updating or radio access network-based notification area updating is performed by a second terminal; and a judgment module configured to determine, based on the first information, whether to perform mobility registration updating or radio access network-based notification area updating.

According to a fifth aspect, a terminal is provided, where the terminal includes a processor, a memory, and a program or instructions stored in the memory and capable of running on the processor, and when the program or instructions are executed by the processor, the steps of the method according to the first aspect or the second aspect are implemented.

According to a sixth aspect, a readable storage medium is provided, where the readable storage medium stores a program or instructions, and when the program or instructions are executed by a processor, the steps of the method according to the first aspect or the second aspect are implemented.

According to a seventh aspect, a chip is provided. The chip includes a processor and a communication interface, where the communication interface is coupled to the processor, and the processor is configured to run a program or instructions on a network-side device to implement the method according to the first aspect or the second aspect.

According to an eighth aspect, a computer program product is provided, where the computer program product is stored in a non-transitory storage medium, and the computer program product is executed by at least one processor to implement the method according to the first aspect or the second aspect.

According to a ninth aspect, a communication device is provided, where the communication device is configured to perform the method according to the first aspect or the second aspect.

BRIEF DESCRIPTION OF DRAWINGS

FIG. 5 is a schematic flowchart of a relay communication method performed by a first terminal according to an embodiment of this application;

FIG. 6 is a schematic flowchart of a relay communication method performed by a second terminal according to an embodiment of this application;

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that data used in this way is interchangeable in appropriate circumstances such that the embodiments of this application can be implemented in other orders than the order illustrated or described herein. In addition, objects distinguished by "first" and "second" are generally of a same type, and the quantities of the objects are not limited, for example, there may be one or more first objects. In addition, in this specification and claims, "and/or" indicates at least one of the connected objects, and the character "/" generally indicates an "or" relationship between the contextually associated objects.

It should be noted that the technologies described in the embodiments of this application are not limited to long term evolution (LTE)/LTE-advanced (LTE-A) systems, but may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (NR) system is described for illustration purposes, and NR terms are used in most of the following descriptions, although these technologies may also be applied to other applications than the NR system application, for example, the 6th generation (6th Generation, 6G) communication system.

Figure 1:
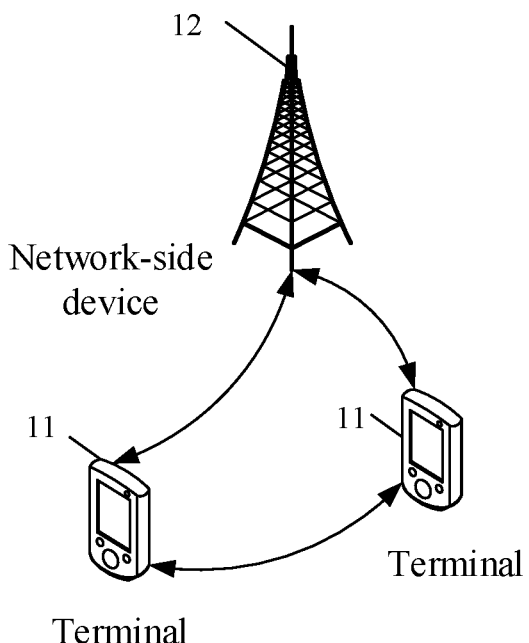
FIG. 1 is a block diagram of a wireless communication system to which embodiments of this application are applicable.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a wrist band, earphones, glasses, or the like. It should be noted that the terminal 11 is not limited to any particular type in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), or other appropriate terms in the art. Provided that the same technical effects are achieved, the base station is not limited to any specific technical term. It should be noted that in the embodiments of this application, only the base station in the NR system is used as an example, although the specific type of the base station is not limited.

The following first briefly describes related content of relay communication involved in the embodiments of this application.

Figure 2:
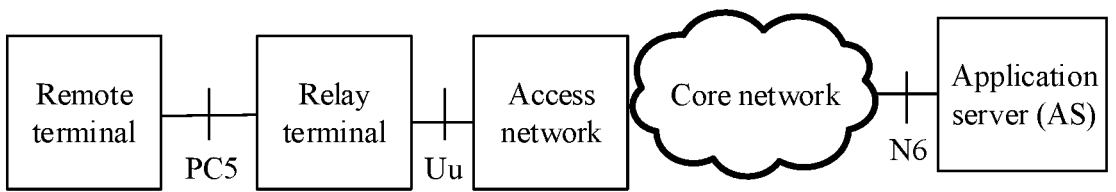
FIG. 2 is a schematic structural diagram of a relay communication system in the related art.

Refer to FIG. 2. FIG. 2 is a schematic structural diagram of a relay communication system in the related art. A remote terminal and a relay terminal establish a relay connection through a direct communication interface (PC5 interface), and the relay terminal connects to an access network through a cellular network communication interface (Uu interface).

Figure 3:
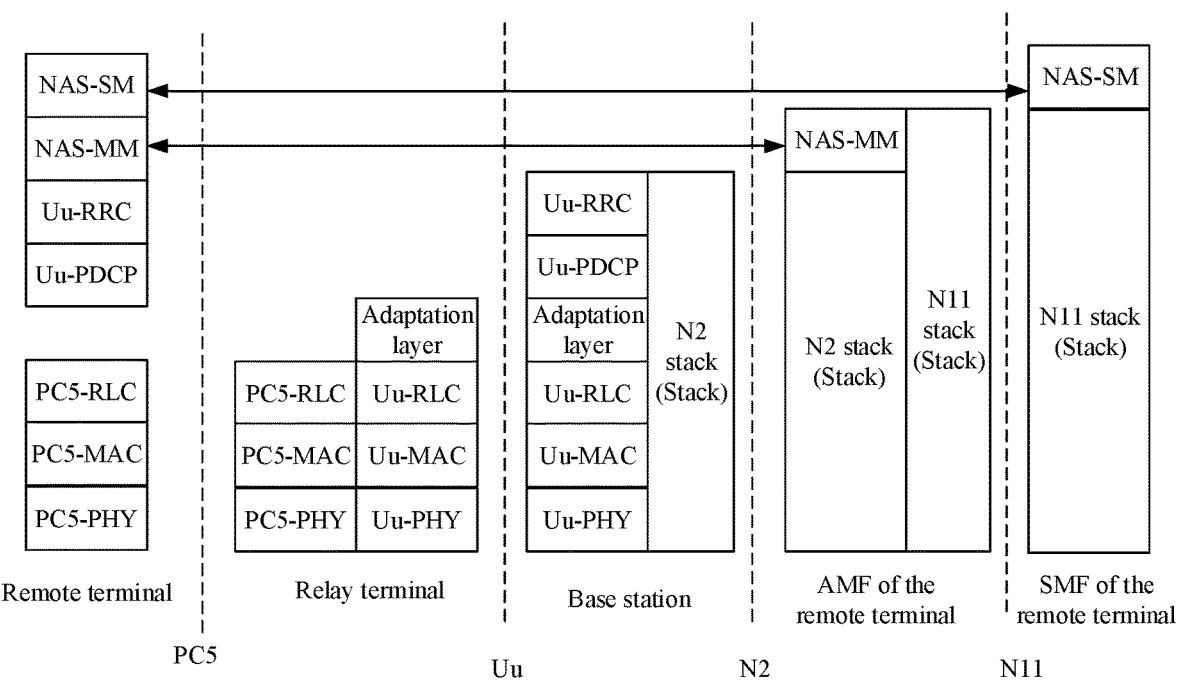
FIG. 3 is a schematic structural diagram of a control plane protocol stack of a relay terminal in the related art.
Figure 4:
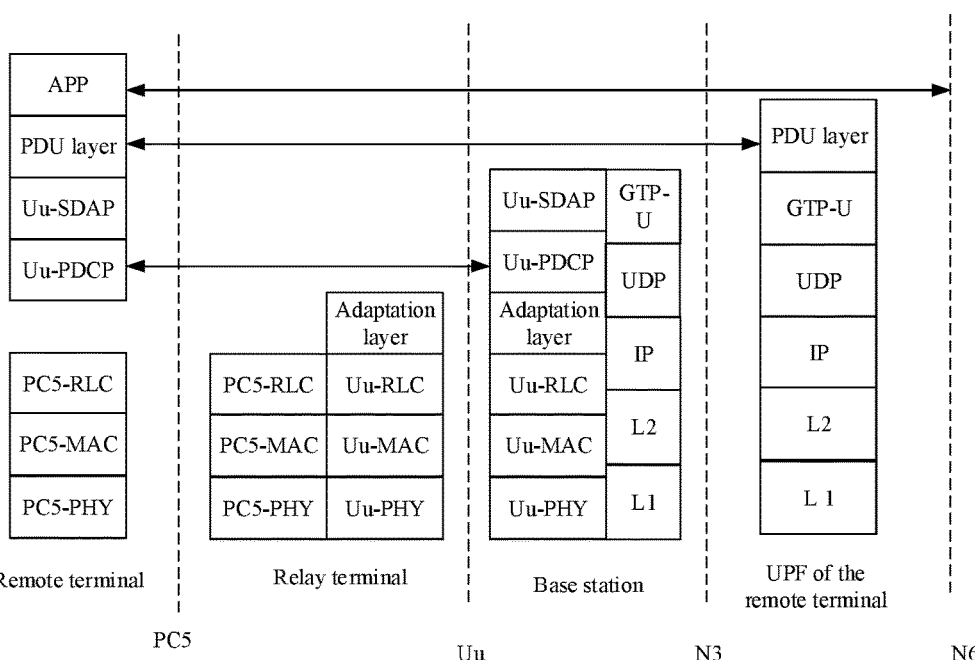
FIG. 4 is a schematic structural diagram of a user plane protocol stack of a relay terminal in the related art.

Refer to FIG. 3. FIG. 3 is a schematic structural diagram of a control plane protocol stack of a relay terminal in the related art. Refer to FIG. 4. FIG. 4 is a schematic structural diagram of a user plane protocol stack of a relay terminal in the related art.

Connected states in layer-2 relay communication are described as follows.

A relay terminal can only relay data or signaling of a remote terminal in a connection management connected state (CM-CONNECTED)/radio resource control connected state (RRC Connected).

In a case that the relay terminal receives a PC5 connection establishment request for relay communication from the remote terminal in a connection management idle state (CM_IDLE), the relay terminal should trigger a service request procedure to change to the CM-CONNECTED state.

When the remote terminal is in the CM-CONNECTED state, the relay terminal should also be in the CM-CONNECTED state.

When all the remote terminals connected to the relay terminal have entered the CM-IDLE state, the relay terminal may change to the CM-IDLE state.

When the remote terminal is in the CM-IDLE state or the CM-CONNECTED state, the relay terminal maintains the PC5 connection to the remote terminal.

Registration and Connection Management:

For layer-2 relay communication, the remote terminal and the relay terminal belong to a same registered public land mobile network (PLMN) or equivalent PLMN (Equivalent Public Land Mobile Network, ePLMN).

Generally, after UE is registered, the network sends a registration area to the UE. When the UE moves out of the registration area, the UE should initiate a mobility registration update procedure, and the network side allocates a new registration area to the UE.

The following describes in detail a relay communication method and apparatus provided in the embodiments of this application through specific embodiments and application scenarios thereof with reference to the accompanying drawings.

Refer to FIG. 5. An embodiment of this application provides a relay communication method performed by a first terminal. The method includes the following step.

Step 51. Send first information to a second terminal, the first information being used to indicate information related to a serving cell for the first terminal or used to indicate that mobility registration updating or radio access network-based notification area updating is performed by the second terminal.

In this embodiment of this application, the first terminal sends the first information to the second terminal, the first information being used to indicate the information related to the serving cell for the first terminal or directly indicate that mobility registration updating or radio access network-based notification area updating is performed by the second terminal. In this way, the second terminal can determine, based on the first information, whether to perform mobility registration updating or radio access network-based notification area updating, so that even if being out of coverage of the serving cell, the second terminal can still initiate a mobility registration update or radio access network-based notification area update procedure in time.

In an embodiment of this application, optionally, the information related to the serving cell for the first terminal includes at least one of the following: a cell identifier (ID), a PLMN identifier, a tracking area code (TAC, such as Tracking Area Information, TAI), and a radio access network-based notification area code (RAN notification area code, RNAC).

In an embodiment of this application, optionally, before the sending first information to a second terminal, the method further includes:

receiving dedicated system information sent by a network side, the dedicated system information including the information related to the serving cell for the first terminal.

In a non-handover scenario, the network side is the serving cell of the first terminal, and the dedicated system information is generated and delivered by the serving cell of the first terminal. In a handover scenario, the dedicated system information is generated by a target cell to which the first terminal is to hand over, but is forwarded by a current serving cell of the first terminal to the first terminal.

In an embodiment of this application, optionally, the dedicated system information is carried in a handover command or radio resource control (RRC) reconfiguration information. Optionally, the handover command is a system information block (S SIB) of the target cell.

In an embodiment of this application, optionally, before the sending first information to a second terminal, the method further includes:

receiving second information sent by the second terminal, the second information including state information of the second terminal; and determining, based on the second information, content of the first information.

Optionally, the state information of the second terminal includes the second terminal being in a connection management CM idle (IDLE) state, the second terminal being in both a CM connected state and an RRC inactive (inactive) state, or the second terminal being in a CM connected state.

For example:

In some embodiments, in a case that the second terminal is in a CM idle state, the content of the first information includes at least a TAC, and may further include a PLMN identifier.

In some embodiments, in a case that the second terminal is in both a CM connected state and an RRC inactive state, the content of the first information includes at least a cell identifier, and may further include a tracking area code, a PLMN identifier, and/or an RNAC.

In some embodiments, in a case that the second terminal is in a CM connected state, the content of the first information includes at least a tracking area code, and may further include a cell identifier, a PLMN identifier, and/or an RNAC.

In some embodiments, in a case that the second terminal is in a CM idle state, the content of the first information includes at least a tracking area code, and may further include a PLMN identifier.

In some embodiments, in a case that the second terminal is in both a CM connected state and an RRC inactive state, the content of the first information includes at least a cell identifier, and may further include a tracking area code, a PLMN identifier, and/or an RNAC.

In some embodiments, in a case that the second terminal is in a CM connected state, the content of the first information includes at least a tracking area code, and may further include a cell identifier, a PLMN identifier, and/or an RNAC.

In an embodiment of this application, optionally, before the sending first information to a second terminal, the method further includes: receiving third information, the third information including configuration information of a registration area and/or radio access network-based notification area of the second terminal.

Optionally, the receiving third information includes: receiving the third information sent by the second terminal, an access network (RAN), or a core network.

The core network may be, for example, an access and mobility management function (AMF). Certainly, the core network may alternatively be another core network device.

Optionally, after the receiving third information, the method further includes: determining, based on a matching condition of the third information and the information related to the serving cell for the first terminal, whether to send the first information. In a case that the third information does not match the information related to the serving cell for the first terminal, it indicates that the first terminal has left the registration area and/or the radio access network-based notification area. In this case, the first information needs to be sent to the second terminal, so that the second terminal can initiate mobility registration updating or radio access network-based notification area updating in time.

Further optionally, the determining, based on a matching condition of the third information and the information related to the serving cell for the first terminal, whether to send the first information includes:

in a case that the registration area of the second terminal in the third information does not include at least one of a PLMN identifier and a tracking area code in the information related to the serving cell for the first terminal, determining to send the first information;

or in a case that the radio access network-based notification area of the second terminal in the third information does not include a combination of at least one of a cell identifier, a PLMN identifier, a tracking area code, and a radio access network-based notification area code in the information related to the serving cell for the first terminal, determining to send the first information.

Information of the registration area includes a PLMN identifier and a tracking area code.

Information of the radio access network-based notification area includes one of the following:

a PLMN identifier and a cell identity;

a PLMN identifier and a tracking area code; and a PLMN identifier, a tracking area code, and a radio access network-based notification area code.

In an embodiment of this application, optionally, the sending first information to a second terminal includes: sending the first information to the second terminal in a discovery stage, connection establishing stage, or after connection has been established regarding the second terminal.

In the foregoing embodiments of this application, optionally, the first terminal is a relay terminal, and the second terminal is a remote terminal.

Refer to FIG. 6. An embodiment of this application further provides a relay communication method performed by a second terminal. The method includes the following steps.

Step 61. Receive first information sent by a first terminal, the first information being used to indicate information related to a serving cell for the first terminal or used to indicate that mobility registration updating or radio access network-based notification area updating is performed by the second terminal.

Step 62. Determine, based on the first information, whether to perform mobility registration updating or radio access network-based notification area updating.

In this embodiment of this application, the second terminal can determine, based on the first information sent by the first terminal, whether to perform mobility registration updating or radio access network-based notification area updating, so that even if being out of coverage of the serving cell, the second terminal can still initiate a mobility registration update or radio access network-based notification area update procedure in time.

In this embodiment of this application, optionally, the information related to the serving cell for the first terminal includes at least one of the following: a cell identifier, a PLMN identifier, a tracking area code, and a radio access network-based notification area code.

In this embodiment of this application, optionally, the determining, based on the first information, whether to perform mobility registration updating or radio access network-based notification area updating includes:

performing mobility registration updating in a case that at least one of a PLMN identifier and a tracking area code in the information, indicated by the first information, related to the serving cell for the first terminal is different from a registration area of the second terminal;

or performing radio access network-based notification area updating in a case that a combination of at least one of a cell identifier, a PLMN identifier, a tracking area code, and a radio access network-based notification area code in the information, indicated by the first information, related to the serving cell for the first terminal is different from a radio access network-based notification area of the second terminal;

or performing mobility registration updating in a case that the first information indicates that mobility registration updating is performed by the second terminal;

or performing radio access network-based notification area updating in a case that the first information indicates that radio access network-based notification area updating is performed by the second terminal.

In this embodiment of this application, optionally, the method further includes: sending second information to the first terminal, the second information including state information of the second terminal.

Optionally, the state information of the second terminal includes the second terminal being in a CM idle state, the second terminal being in both a CM connected state and an RRC inactive state, or the second terminal being in a CM connected state.

In this embodiment of this application, optionally, the method further includes: sending third information to the first terminal, the third information including configuration information of a registration area and/or radio access network-based notification area of the second terminal.

In the foregoing embodiments of this application, optionally, the first terminal is a relay terminal, and the second terminal is a remote terminal.

The following describes the relay communication method in this application by using examples with reference to specific embodiments.

Embodiment 1 of the present disclosure: In a case that a PC5 connection is present, a first terminal sends first information to a second terminal.

Figure 7:
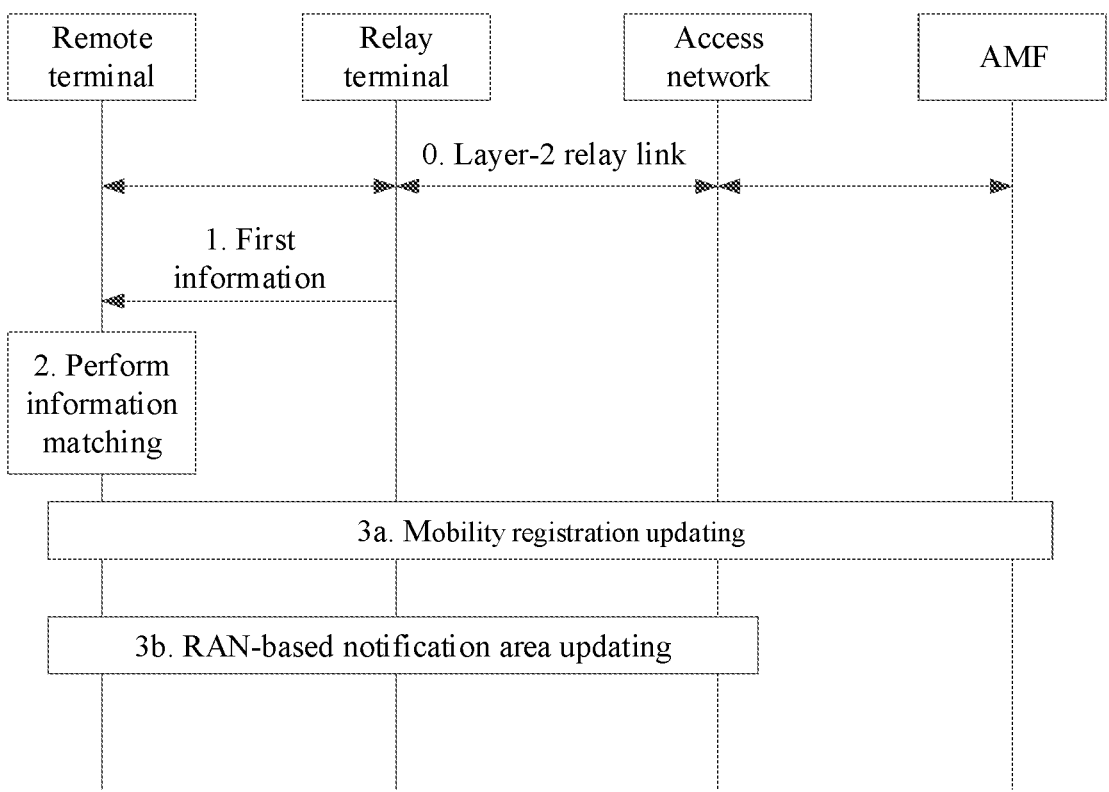
FIG. 7 is a schematic interaction flowchart of a relay communication method according to an embodiment of this application.

Refer to FIG. 7. The relay communication method in this embodiment of this application includes the following steps.

Step 0. A remote terminal establishes a layer-2 relay link through a relay terminal, and the remote terminal maintains a relay connection to the relay terminal.

Step 1. The relay terminal sends first information to the remote terminal, where the first information includes information related to a serving cell for the first terminal, and the information related to the serving cell for the first terminal includes at least one of the following: a cell identifier, a public land mobile network PLMN identifier, a tracking area code, and a radio access network-based notification area code.

Optionally, the first information is content of dedicated system information, and the dedicated system information may be sent by an access network to the relay terminal via a handover command or an RRC reconfiguration message.

Step 2. The remote terminal matches the first information sent by the relay terminal and a registration area or an RAN-based notification area configured by the remote terminal, to determine whether to perform mobility registration updating or radio access network-based notification area updating.

Step 3a. In a case that the TAC in the first information is not included in the RNA configured by the remote terminal, the remote terminal performs a mobility registration update procedure.

Step 3b. In a case that the RNAC in the first information is not included in the RNA configured by the remote terminal, the remote terminal performs an RAN-based notification area update procedure.

Embodiment 2 of the present disclosure: Before Embodiment 1 is performed, the remote terminal provides second information to the relay terminal, and the relay terminal determines, based on the second information, content of the first information to be sent to the remote terminal.

Figure 8:
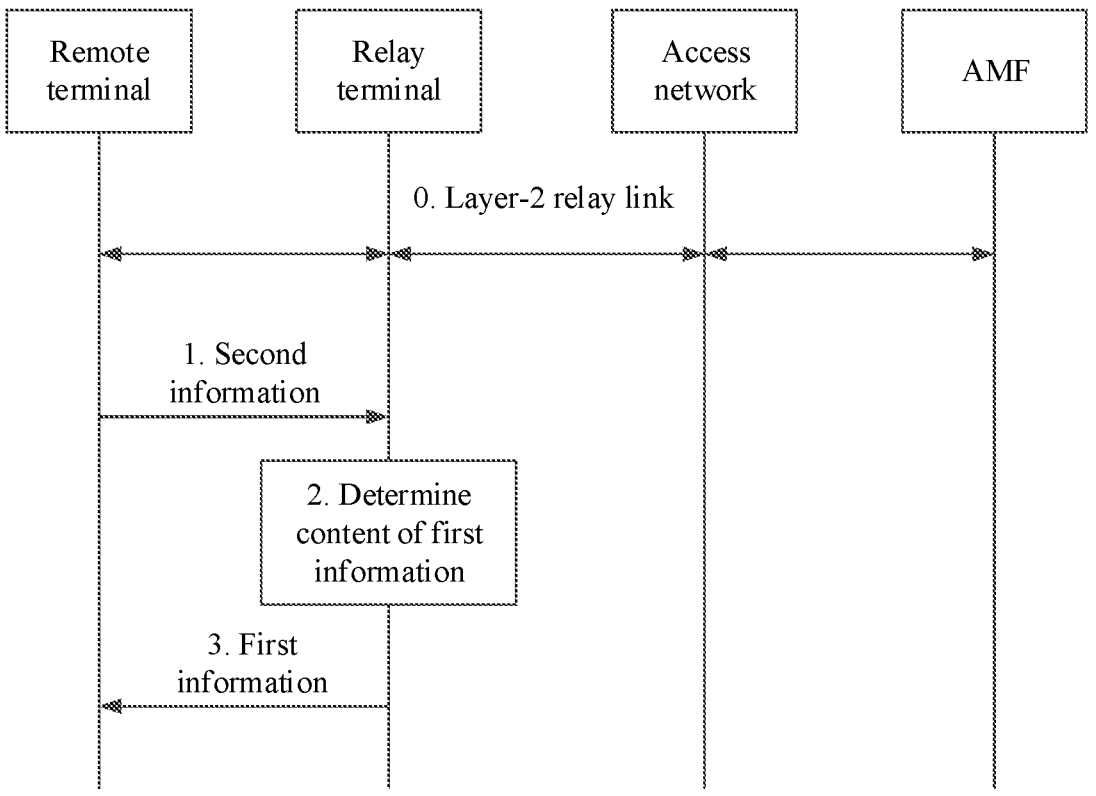
FIG. 8 is a schematic interaction flowchart of a relay communication method according to another embodiment of this application.

Refer to FIG. 8. The relay communication method in this embodiment of this application includes the following steps.

Step 0. A remote terminal establishes a layer-2 relay link through a relay terminal, and the remote terminal maintains the relay connection to the relay terminal.

Step 1. The remote terminal sends second information to the relay terminal, where the second information includes state information of the remote terminal, and the state information of the second terminal includes the second terminal being in a CM idle state, the second terminal being in both a CM connected state and an RRC inactive state, or the second terminal being in a CM connected state.

Step 2. After receiving the second information, the relay terminal determines content of the first information, which includes one of the following:

In a case that the remote terminal is in a CM idle state, the content of the first information includes at least a TAC, and may further include a PLMN identifier.

In a case that the remote terminal is in both a CM connected state and an RRC inactive state, the content of the first information includes at least a cell identifier, and may further include a tracking area code, a PLMN identifier, and/or an RNAC.

In a case that the remote terminal is in a CM connected state, the content of the first information includes at least a tracking area code, and may further include a cell identifier, a PLMN identifier, and/or an RNAC.

Step 3. After determining the content of the first information, the relay terminal sends the first information to the remote terminal.

Embodiment 3 of the present disclosure: Before step 1 of Embodiment 1 is performed, the remote terminal, the access network, or an AMF sends third information to the relay terminal, and the relay terminal determines, based on the third information, whether to send the first information to the remote terminal.

Figure 9:
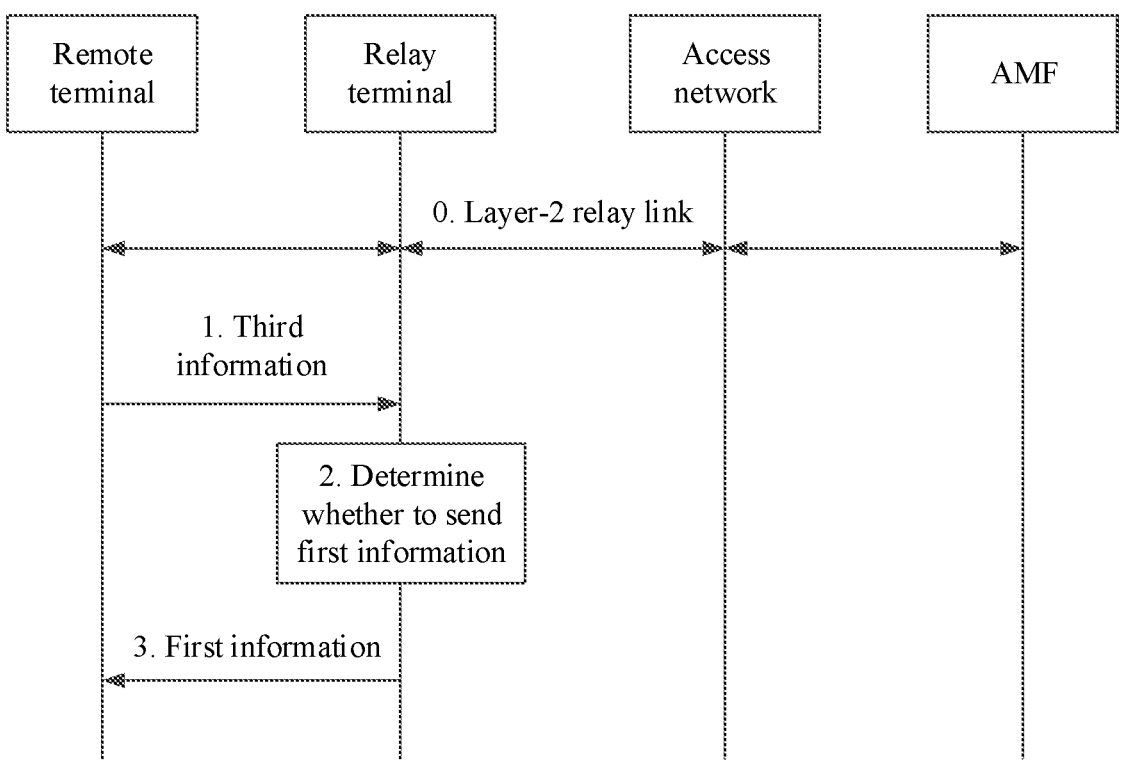
FIG. 9 is a schematic interaction flowchart of a relay communication method according to still another embodiment of this application.

Refer to FIG. 9. The relay communication method in this embodiment of this application includes:

Step 0. A remote terminal establishes a layer-2 relay link through a relay terminal, and the remote terminal maintains the relay connection with the relay terminal.

Step 1. The remote terminal, the access network, or an AMF sends third information to the relay terminal, where the third information includes configuration information of a registration area and/or radio access network-based notification area of the second terminal.

Step 2. The relay terminal determines, based on a matching condition of the third information and the information related to the serving cell for the first terminal, whether to send the first information, where the first information is used to indicate the information related to the serving cell for the first terminal or used to indicate that mobility registration updating or radio access network-based notification area updating is performed by the second terminal. Specifically:

in a case that the registration area of the second terminal in the third information does not include at least one of a PLMN identifier and a tracking area code in the information related to the serving cell for the first terminal, the relay terminal determines to send the first information;

or in a case that the radio access network-based notification area of the second terminal in the third information does not include a combination of at least one of a cell identifier, a PLMN identifier, a tracking area code, and a radio access network-based notification area code in the information related to the serving cell for the first terminal, the relay terminal determines to send the first information.

It should be noted that the relay communication method provided in the embodiments of this application may be performed by a relay communication apparatus or a control module for performing the relay communication method in the relay communication apparatus. In the embodiments of this application, the relay communication method being performed by the relay communication apparatus is used as an example to describe the relay communication apparatus provided in the embodiments of this application.

Figure 10:
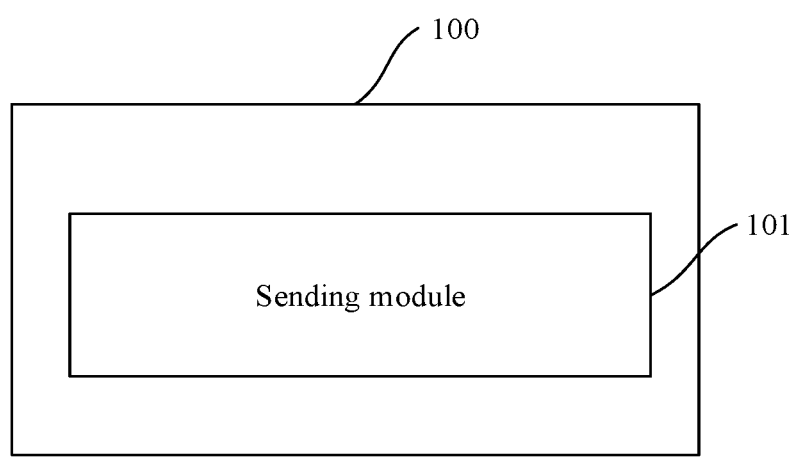
FIG. 10 is a schematic structural diagram of a terminal according to an embodiment of this application.

Refer to FIG. 10. An embodiment of this application further provides a relay communication apparatus 100, including:

a sending module 101 configured to send first information to a second terminal, the first information being used to indicate information related to a serving cell for a first terminal or used to indicate that mobility registration updating or radio access network-based notification area updating is performed by the second terminal.

In this embodiment of this application, the first information is sent to the second terminal, the first information being used to indicate the information related to the serving cell for the first terminal or directly indicate that mobility registration updating or radio access network-based notification area updating is performed by the second terminal. In this way, the second terminal can determine, based on the first information, whether to perform mobility registration updating or radio access network-based notification area updating, so that even if being out of coverage of the serving cell, the second terminal can still initiate a mobility registration update or radio access network-based notification area update procedure in time.

Optionally, the information related to the serving cell for the first terminal includes at least one of the following: a cell identifier, a PLMN identifier, a tracking area code, and a radio access network-based notification area code.

Optionally, the relay communication apparatus 100 further includes:

a first receiving module configured to receive dedicated system information sent by a network side, the dedicated system information including the information related to the serving cell for the first terminal.

Optionally, the dedicated system information is carried in a handover command or RRC reconfiguration information.

Optionally, the relay communication apparatus 100 further includes:

a second receiving module configured to receive second information sent by the second terminal, the second information including state information of the second terminal; and a determining module configured to determine, based on the second information, content of the first information.

Optionally, the state information of the second terminal includes the second terminal being in a connection management CM idle state, the second terminal being in both a CM connected state and an RRC inactive state, or the second terminal being in a CM connected state.

Optionally, the relay communication apparatus 100 further includes:

a third receiving module configured to receive third information, the third information including configuration information of a registration area and/or radio access network-based notification area of the second terminal.

Optionally, the third receiving module is configured to receive the third information sent by the second terminal, an access network, or a core network.

Optionally, the relay communication apparatus 100 further includes:

a judgment module configured to determine, based on a matching condition of the third information and the information related to the serving cell for the first terminal, whether to send the first information.

Optionally, the judgment module is configured to perform one of the following:

in a case that the registration area of the second terminal in the third information does not include at least one of a PLMN identifier and a tracking area code in the information related to the serving cell for the first terminal, determining to send the first information; or in a case that the radio access network-based notification area of the second terminal in the third information does not include a combination of at least one of a cell identifier, a PLMN identifier, a tracking area code, and a radio access network-based notification area code in the information related to the serving cell for the first terminal, determining to send the first information.

Optionally, the sending module 101 is configured to send the first information to the second terminal in a discovery stage, connection establishing stage, or after connection has been established regarding the second terminal.

The relay communication apparatus in this embodiment of this application may be a terminal, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in the embodiments of this application.

The relay communication apparatus in this embodiment of this application may be an apparatus with an operating system. The operating system may be an Android operating system, an iOS operating system, or another possible operating system, which is not specifically limited in this embodiment of this application.

The relay communication apparatus provided in this embodiment of this application can implement the processes implemented in the method embodiment shown in FIG. 5, with the same technical effects achieved. To avoid repetition, details are not described herein again.

Figure 11:
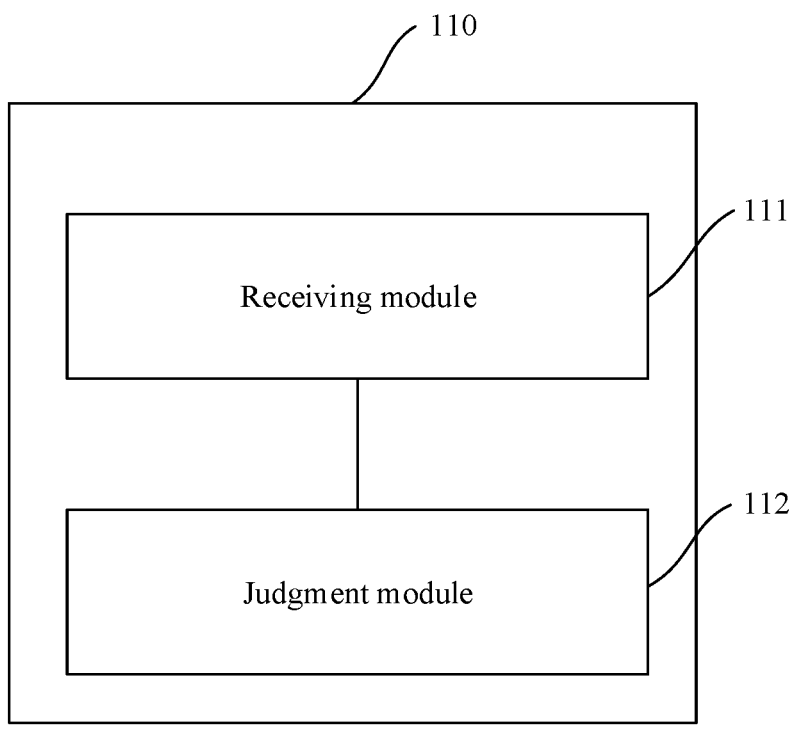
FIG. 11 is a schematic structural diagram of a terminal according to another embodiment of this application.

Refer to FIG. 11. An embodiment of this application further provides a relay communication apparatus 110, including:

a receiving module 111 configured to receive first information sent by a first terminal, the first information being used to indicate information related to a serving cell for the first terminal or used to indicate that mobility registration updating or radio access network-based notification area updating is performed by a second terminal; and a judgment module 112 configured to determine, based on the first information, whether to perform mobility registration updating or radio access network-based notification area updating.

In this embodiment of this application, the second terminal can determine, based on the first information sent by the first terminal, whether to perform mobility registration updating or radio access network-based notification area updating, so that even if being out of coverage of the serving cell, the second terminal can still initiate a mobility registration update or radio access network-based notification area update procedure in time.

Optionally, the information related to the serving cell for the first terminal includes at least one of the following: a cell identifier, a PLMN identifier, a tracking area code, and a radio access network-based notification area code.

Optionally, the judgment module 112 is configured to perform one of the following:

performing mobility registration updating in a case that at least one of a PLMN identifier and a tracking area code in the information, indicated by the first information, related to the serving cell for the first terminal is different from a registration area of the second terminal;

performing radio access network-based notification area updating in a case that a combination of at least one of a cell identifier, a PLMN identifier, a tracking area code, and a radio access network-based notification area code in the information, indicated by the first information, related to the serving cell for the first terminal is different from a radio access network-based notification area of the second terminal;

performing mobility registration updating in a case that the first information indicates that mobility registration updating is performed by the second terminal; or performing radio access network-based notification area updating in a case that the first information indicates that radio access network-based notification area updating is performed by the second terminal.

Optionally, the relay communication apparatus 110 further includes:

a first sending module configured to send second information to the first terminal, the second information including state information of the second terminal.

Optionally, the state information of the second terminal includes the second terminal being in a CM idle state, the second terminal being in both a CM connected state and an RRC inactive state, or the second terminal being in a CM connected state.

Optionally, the relay communication apparatus 110 further includes:

a second sending module configured to send third information to the first terminal, the third information including configuration information of a registration area and/or radio access network-based notification area of the second terminal.

The relay communication apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The relay communication apparatus in this embodiment of this application may be an apparatus with an operating system. The operating system may be an Android (Android) operating system, an iOS operating system, or another possible operating system, which is not specifically limited in this embodiment of this application.

The relay communication apparatus provided in this embodiment of this application can implement the processes implemented in the method embodiment shown in FIG. 6, with the same technical effects achieved. To avoid repetition, details are not described herein again.

Figure 12:
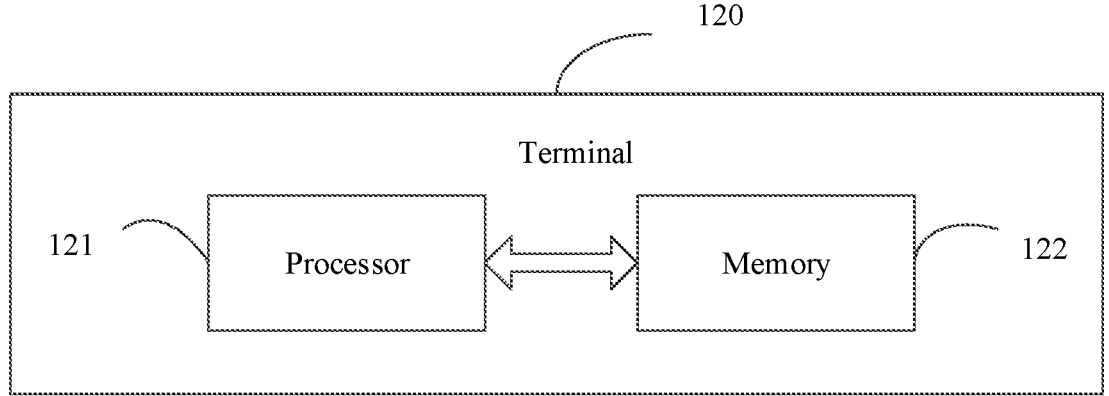
FIG. 12 is a schematic structural diagram of a terminal according to still another embodiment of this application.

As shown in FIG. 12, an embodiment of this application further provides a terminal 120, including a processor 121, a memory 122, and a program or instructions stored in the memory 122 and capable of running on the processor 121, where when the program or instructions are executed by the processor 121, the processes of the foregoing embodiments of the relay communication method are implemented, with the same technical effects achieved. To avoid repetition, details are not described herein again.

Figure 13:
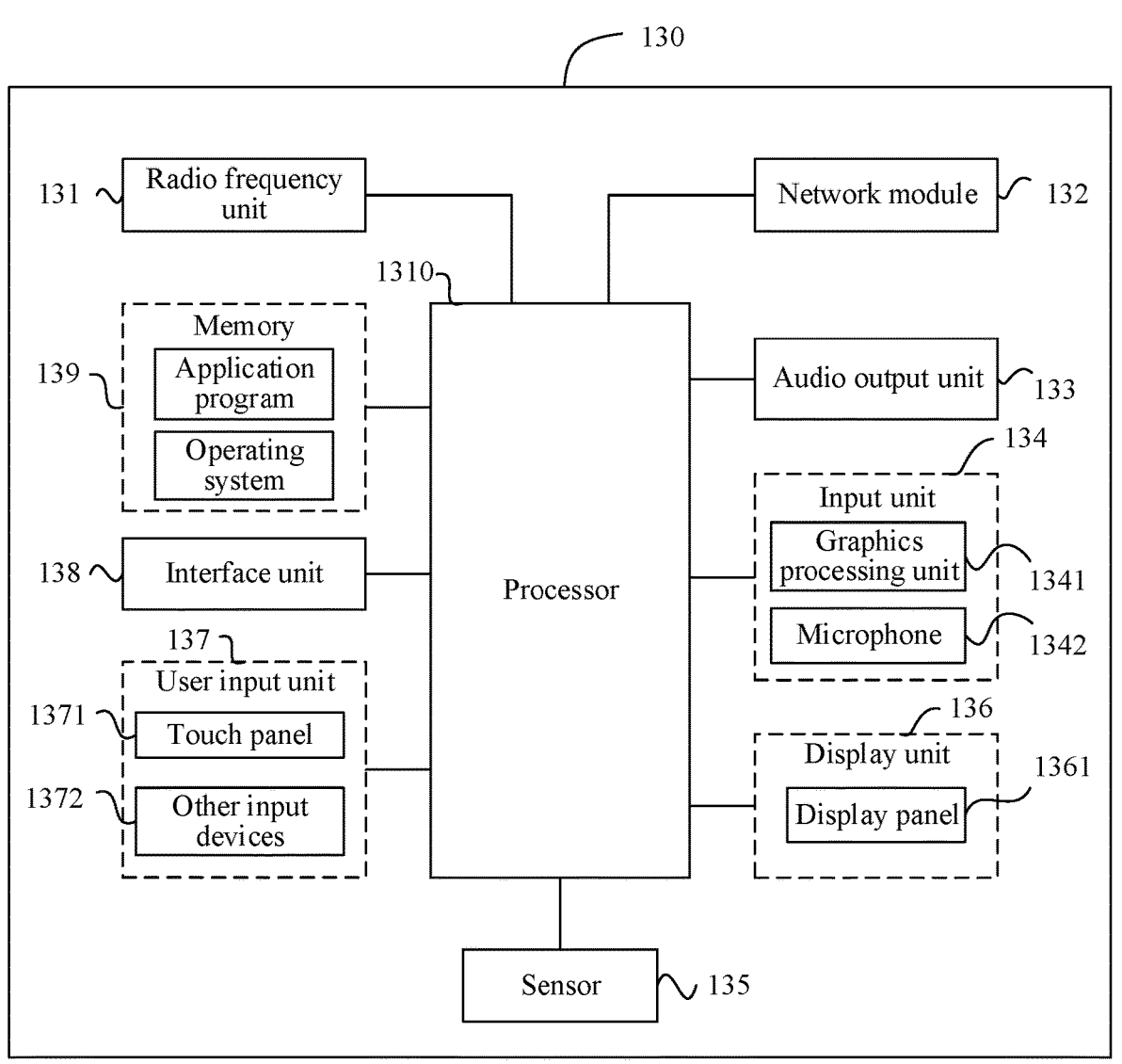
FIG. 13 is a schematic diagram of a hardware structure of a terminal according to an embodiment of this application.

FIG. 13 is a schematic diagram of a hardware structure of a terminal for implementing the embodiments of this application. The terminal 130 includes but is not limited to components such as a radio frequency unit 131, a network module 132, an audio output unit 133, an input unit 134, a sensor 135, a display unit 136, a user input unit 137, an interface unit 138, a memory 139, and a processor 1310.

Persons skilled in the art can understand that the terminal 130 may further include a power supply (for example, battery) for supplying power to the components. The power supply may be logically connected to the processor 1310 via a power management system, so that functions such as charge management, discharge management, and power consumption management are implemented via the power management system. The terminal structure shown in FIG. 13 does not constitute any limitation on the terminal. The terminal may include more or fewer components than shown in the figure, or combine some of the components, or arrange the components differently. Details are not described herein.

It should be understood that in this embodiment of this application, the input unit 134 may include a graphics processing unit (GPU) 1341 and a microphone 1342. The graphics processing unit 1341 processes image data of a static picture or video that is acquired by an image capture apparatus (for example, camera) in an image capture mode or video capture mode. The display unit 136 may include a display panel 1361, and the display panel 1361 may be configured in a form of a liquid crystal display, an organic light-emitting diode display, or the like. The user input unit 137 includes a touch panel 1371 and other input devices 1372. The touch panel 1371 is also referred to as a touch-screen. The touch panel 1371 may include two parts: a touch detection apparatus and a touch controller. The other input devices 1372 may include but are not limited to a physical keyboard, a functional button (such as a volume control button or a power on/off button), a trackball, a mouse, and a joystick. Details are not described herein.

In this embodiment of this application, the radio frequency unit 131 sends downlink data received from a network-side device to the processor 1310 for processing, and in addition, sends uplink data to the network-side device. Generally, the radio frequency unit 131 includes but is not limited to an antenna, at least one amplifier, a transceiver, a coupler, a low noise amplifier, and a duplexer.

The memory 139 may be configured to store a software program or instructions and various data. The memory 139 may mainly include a program or instruction storage area and a data storage area. The program or instruction storage area may store an operating system, an application program or instructions required by at least one function (for example, a sound play function or an image play function), and the like. In addition, the memory 139 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other non-volatile solid-state storage device.

The processor 1310 may include one or more processing units. Optionally, the processor 1310 may integrate an application processor and a modem processor. The application processor mainly processes an operating system, a user interface, an application program or instructions, and the like. The modem processor mainly processes wireless communication, for example, being a baseband processor. It can be understood that the modem processor may alternatively be not integrated in the processor 1310.

As a first terminal, the radio frequency unit 131 is configured to send first information to a second terminal, the first information being used to indicate information related to a serving cell for the first terminal or used to indicate that mobility registration updating or radio access network-based notification area updating is performed by the second terminal.

In this embodiment of this application, the first terminal sends the first information to the second terminal, the first information being used to indicate the information related to the serving cell for the first terminal or directly indicate that mobility registration updating or radio access network-based notification area updating is performed by the second terminal. In this way, the second terminal can determine, based on the first information, whether to perform mobility registration updating or radio access network-based notification area updating, so that even if being out of coverage of the serving cell, the second terminal can still initiate a mobility registration update or radio access network-based notification area update procedure in time.

Optionally, the information related to the serving cell for the first terminal includes at least one of the following: a cell identifier, a public land mobile network PLMN identifier, a tracking area code, and a radio access network-based notification area code.

Optionally, the radio frequency unit 131 is further configured to receive dedicated system information sent by a network side, the dedicated system information including the information related to the serving cell for the first terminal.

Optionally, the dedicated system information is carried in a handover command or RRC reconfiguration information.

The radio frequency unit 131 is further configured to receive second information sent by the second terminal, the second information including state information of the second terminal; and determine, based on the second information, content of the first information.

Optionally, the state information of the second terminal includes the second terminal being in a connection management CM idle state, the second terminal being in both a CM connected state and an RRC inactive state, or the second terminal being in a CM connected state.

Optionally, the radio frequency unit 131 is further configured to receive third information, the third information including configuration information of a registration area and/or radio access network-based notification area of the second terminal.

Optionally, the radio frequency unit 131 is further configured to receive the third information sent by the second terminal, an access network, or a core network.

Optionally, the processor 1310 is further configured to determine, based on a matching condition of the third information and the information related to the serving cell for the first terminal, whether to send the first information.

Optionally, the processor 1310 is further configured to: in a case that the registration area of the second terminal in the third information does not include at least one of a PLMN identifier and a tracking area code in the information related to the serving cell for the first terminal, determine to send the first information;

or in a case that the radio access network-based notification area of the second terminal in the third information does not include a combination of at least one of a cell identifier, a PLMN identifier, a tracking area code, and a radio access network-based notification area code in the information related to the serving cell for the first terminal, determine to send the first information.

Optionally, the processor 1310 is further configured to send the first information to the second terminal in a discovery stage, connection establishing stage, or after connection has been established regarding the second terminal.

Alternatively, as a second terminal,

The radio frequency unit 131 is configured to receive first information sent by a first terminal, the first information being used to indicate information related to a serving cell for the first terminal or used to indicate that mobility registration updating or radio access network-based notification area updating is performed by the second terminal.

The processor 1310 is configured to determine, based on the first information, whether to perform mobility registration updating or radio access network-based notification area updating.

Optionally, the information related to the serving cell for the first terminal includes at least one of the following: a cell identifier, a PLMN identifier, a tracking area code, and a radio access network-based notification area code.

Optionally, the processor 1310 is configured to perform mobility registration updating in a case that at least one of a PLMN identifier and a tracking area code in the information, indicated by the first information, related to the serving cell for the first terminal is different from a registration area of the second terminal;

or perform radio access network-based notification area updating in a case that a combination of at least one of a cell identifier, a PLMN identifier, a tracking area code, and a radio access network-based notification area code in the information, indicated by the first information, related to the serving cell for the first terminal is different from a radio access network-based notification area of the second terminal;

or perform mobility registration updating in a case that the first information indicates that mobility registration updating is performed by the second terminal;

or perform radio access network-based notification area updating in a case that the first information indicates that radio access network-based notification area updating is performed by the second terminal.

Optionally, the radio frequency unit 131 is configured to send second information to the first terminal, the second information including state information of the second terminal.

Optionally, the state information of the second terminal includes the second terminal being in a CM idle state, the second terminal being in both a CM connected state and an RRC inactive state, or the second terminal being in a CM connected state.

The radio frequency unit 131 is configured to send third information to the first terminal, the third information including configuration information of a registration area and/or radio access network-based notification area of the second terminal.

An embodiment of this application further provides a readable storage medium, where the readable storage medium may be non-volatile or volatile. The readable storage medium stores a program or instructions, and when the program or instructions are executed by a processor, the processes of the foregoing embodiments of the relay communication method are implemented, with the same technical effects achieved. To avoid repetition, details are not described herein again.

The processor is a processor in the terminal in the foregoing embodiment. The readable storage medium includes a computer-readable storage medium such as a computer read-only memory (ROM), a random access memory (RAM), a magnetic disk, or an optical disc.

An embodiment of this application further provides a chip. The chip includes a processor and a communication interface. The communication interface is coupled to the processor, and the processor is configured to run a program or instructions of a network-side device to implement the processes of the foregoing embodiments of the relay communication method, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application further provides a computer program product, where the computer program product is stored in a non-transitory readable storage medium, and the computer program product is executed by at least one processor to implement the processes of the foregoing embodiments of the relay communication method, with the same technical effects achieved. To avoid repetition, details are not described herein again.

An embodiment of this application further provides a program product, where the program product is stored in a non-volatile storage medium, and the program product is executed by at least one processor to implement the processes of the foregoing embodiments of the relay communication method, with the same technical effects achieved. To avoid repetition, details are not described herein again.

It should be noted that in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such understanding, the technical solutions of this application essentially or the part thereof that contributes to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms which do not depart from the essence of this application and the protection scope of the claims, and all such forms shall fall within the protection scope of this application.

What is claimed is:

1. A method comprising:

sending first information to a second terminal, wherein the first information is used to indicate information or used to indicate that mobility registration updating or radio access network-based notification area updating, wherein the information is related to a serving cell for a first terminal, wherein the radio access network-based notification area updating is performed by the second terminal, receiving second information sent by a second terminal before the sending of the first information, wherein the second information comprises state information of the second terminal; and determining content of the first information based on the second information before the sending of the first information;

wherein the state information indicates that the second terminal is in a connection management idle state, wherein the second terminal is in both a connection management connected state and an radio resource control inactive state, or the second terminal is in a connection management connected state.

2. The method according to claim 1, wherein the information related to the serving cell for the first terminal comprises at least one of the following: a cell identifier, a public land mobile network identifier, a tracking area code, or a radio access network-based notification area code.

3. The method according to claim 1, further comprising: receiving dedicated system information wherein the dedicated system information comprises the information;

wherein the dedicated system information is carried in a handover command or a radio resource control reconfiguration information.

4. The method according to claim 1, further comprising receiving third information before the sending of the first information, wherein the third information comprises configuration information of a registration area and/or radio access network-based notification area of the second terminal.

5. The method according to claim 4, further comprising determining whether to send the first information based on a matching condition of the third information and the information related to the serving cell for the first terminal after the receiving third information, wherein the determining comprises:

determining the sending the first information if the registration area does not comprise at least one of a public land mobile network identifier or a tracking area code in the information related to the serving cell for the first terminal; or determining the sending the first information if the radio access network-based notification area of the second terminal in the third information does not comprise a combination of at least one of a cell identifier, a public land mobile network identifier, a tracking area code, or a radio access network-based notification area code in the information related to the serving cell for the first terminal.

6. The method according to claim 1, wherein the sending, by a first terminal, first information comprises sending the first information in a discovery stage, connection establishing stage, or after connection has been established regarding the second terminal.

7. A first terminal comprising:

a processor circuit and a memory circuit, wherein the memory circuit is arranged to store instructions for the processor circuit, wherein the processor circuit is arranged to send first information to a second terminal, wherein the first information is used to indicate information or used to indicate that mobility registration updating or radio access network-based notification area updating, wherein the information is related to a serving cell for a first terminal, wherein the radio access network-based notification area updating is performed by the second terminal, wherein the processor circuit is arranged to receive second information, wherein the second information comprises state information of the second terminal, wherein the processor circuit is arranged to determine content of the first information based on the second information, wherein the state information of the second terminal comprises the second terminal is in a connection management idle state, wherein the second terminal is in both a connection management connected state and an radio resource control inactive state, or the second terminal is in a connection management connected state.

8. The first terminal according to claim 7, wherein the information related to the serving cell for the first terminal comprises at least one of the following: a cell identifier, a public land mobile network identifier, a tracking area code, or a radio access network-based notification area code.

9. The first terminal according to claim 7, wherein the processor circuit is arranged to receive third information, wherein the third information comprises configuration information of a registration area and/or radio access network-based notification area of the second terminal.

* * * * *